May 28, 1929.  E. R. HELLMAN  1,715,289
CLEANER FOR PISTON RING GROOVES
Filed June 6, 1927
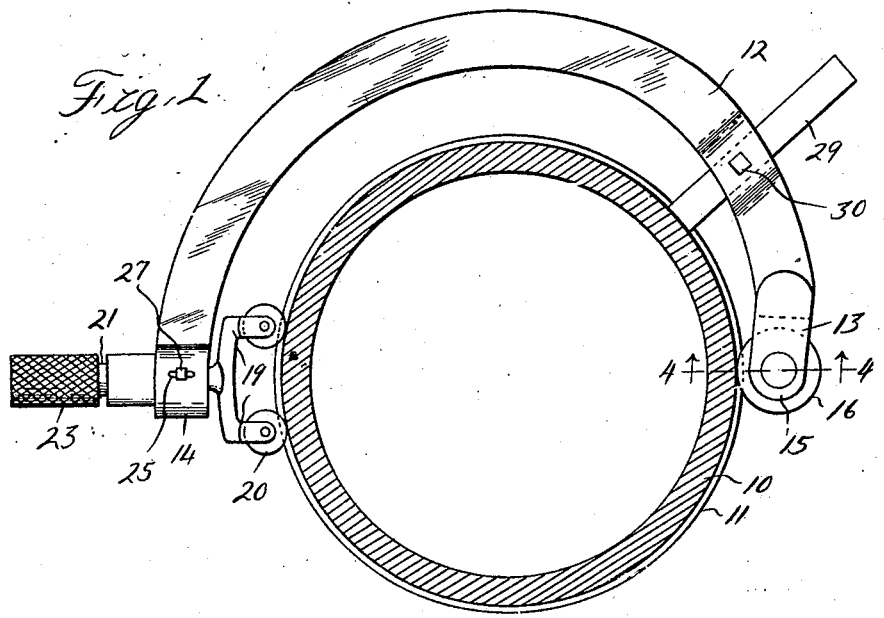
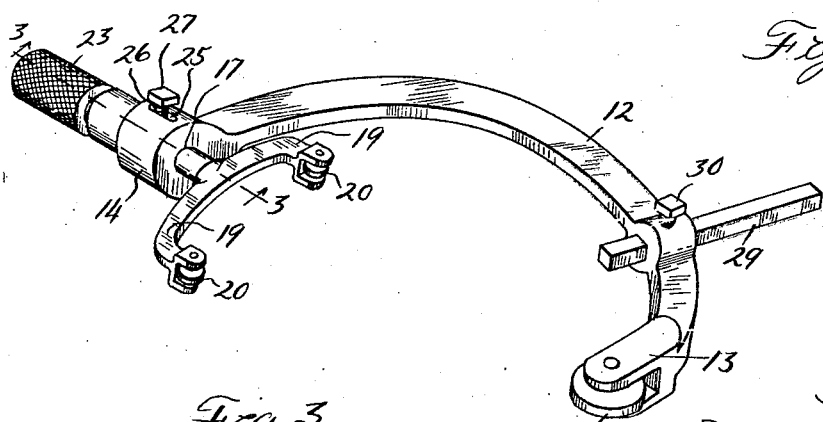
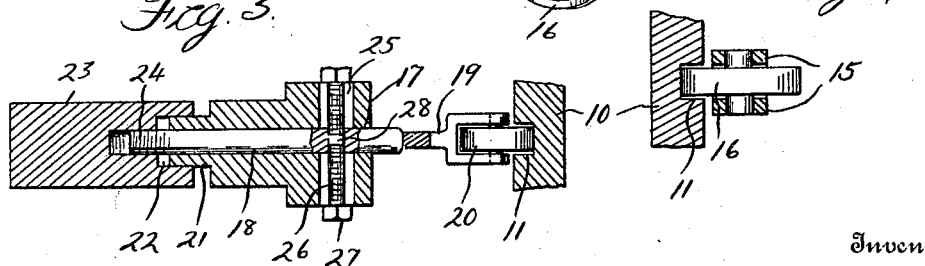
Inventor
Ernest R. Hellman Patented May 28, 1929.

1,715,289

UNITED STATES PATENT OFFICE.

ERNEST REINHOLD HELLMAN, OF DETROIT, MICHIGAN, ASSIGNOR TO SUPERIOR PISTON RING COMPANY, OF DETROIT, MICHIGAN, A CORPORATION OF MICHIGAN.

CLEANER FOR PISTON-RING GROOVES.

Application filed June 6, 1927. Serial No. 196,920.

This invention relates to a cleaner for piston ring grooves and has as its objects to provide a structure tending to simplify, render more efficient and improve generally devices of this character.

The several objects, advantages and novel details of construction of this invention will be made more apparent as this description proceeds, especially when considered in connection with the accompanying drawings wherein:

Figure 1 is a top plan view of a device constructed in accordance with this invention showing the same associated with a piston ring groove of a piston.

Figure 2 is a perspective view of the device.

Figure 3 is a detail sectional view taken substantially on the plane indicated by line 3—3 in Figure 2, and Figure 4 is a detail sectional view taken substantially on the plane indicated by line 4—4 in Figure 1.

Referring now particularly to the drawings wherein like reference characters indicate like parts it will be noted that there is illustrated a piston 10 provided with a piston ring groove 11 and it is for the purpose of cleaning and freeing these grooves of all dirt and foreign matter that this invention is designed.

The device consists of a body 12 curved into a substantially semi-circular shape so that in practice it may be caused to partially encircle the piston to such an extent that the ends 13 and 14 thereof are disposed on opposite sides of the piston. The end 13 is bifurcated to provide a pair of spaced arms 15 between which a roller 16 is mounted. The other end 14 is in the form of a tubular sleeve-like portion provided with an aperture 17 through which a shaft 18 extends. The inner end of this shaft is formed with a pair of laterally spaced arms 19 in the bifurcated end of each of which a roller 20 is rotatably mounted. The sleeve-like portion 14 is provided with a reduced portion 21 which telescopes within a recess 22 formed in the end of a handle member 23 which is threaded as indicated at 24 to the end of shaft 18. The end portion 14 is further provided with a pair of elongated slots 25 through which clamping bolts 26 extend provided with heads 27. The inner ends of the bolts 26 are threaded in an aperture 28 formed in the shaft 18. By loosening the bolts 26 the shaft 18 and handle 23 may be adjusted with reference to the end 14 of the body so as to vary the distance between the guide roller 16 and the pair of guide rollers 20 so as to accommodate the device to pistons of various diameters.

The body 12 is further provided with an aperture through which a cleaning implement or tool 29 extends, this tool being adjustably held in place by means of a set screw 30. The inner end of the tool 29 is adapted to engage in the groove 11 and upon rotation of the body portion 12 to clean the groove as will be obvious.

With the herein described device, the guide rollers 16 and 20 may be caused to engage the piston ring groove 11 as clearly illustrated in Figure 1 whereupon the tool 29 is projected into the groove and upon rotation of the device by means of the handle 23, the tool 29 is caused to traverse the entire length of the groove 11 to thus clean and free the same of all dirt and foreign matter. It is obvious that this device may be adjusted for all sizes of pistons and that the tool 29 may be adjusted or removed entirely and replaced by a new one.

While the invention has been described and illustrated herein somewhat in detail, it will be readily apparent to those skilled in this art that various changes may be made in many of the details of this invention without departing from the spirit and scope thereof and to this end reservation is made to make such changes as may come within the purview of the accompanying claims.

What I claim as my invention is:

1. In a cleaning device for piston ring grooves, a curved body member having an opening, a guide element having an attaching stem received in said opening and provided at the outer portion thereof with a handle, an adjusting device engaging said stem to hold the same against turning and endwise movement with respect to said body, and a scraping element carried by said body.

2. In a cleaning device for piston ring grooves, a curved body member having an opening, a guide element having an attaching stem received in said opening and provided at the outer portion thereof with a handle, said body member being provided with a slot, an adjusting device extending through said slot and engaging said stem to hold the same against turning and endwise movement with respect to said body member, and a scraping element carried by said body member.

3. In a device for cleaning the grooves of pistons, a curved body, spaced guide means carried by said body, one of said means consisting of a roller engageable with the piston, a second guide means carried by said body at substantially the opposite side of the piston and consisting of a pair of rollers engageable with the piston on both sides of a line intersecting the axis of the piston and said first-named guide roller, and a groove cleaning implement carried by said body.

4. In a device for cleaning the grooves of pistons, a curved body, a guide means carried by said body and consisting of a roller engageable with the piston groove, a second guide means carried by said body at substantially the opposite side of the piston and consisting of a pair of spaced rollers engageable with the piston groove on both sides of a line intersecting the axis of the piston and said first-named guide roller, means for adjustably securing one of said guide means to said body, and a groove cleaning implement supported by said body.

5. In a device for cleaning the grooves of pistons, a curved body, spaced guide means carried by said body, one of said means comprising an anti-friction element engageable with the piston groove, and the other guide means being located at substantially the opposite side of the piston and comprising spaced anti-friction elements engageable with the piston at points on both sides of the line intersecting the axis of the piston and said one means, and a groove cleaning implement carried by said body.

In testimony whereof I affix my signature.

ERNEST REINHOLD HELLMAN.